(12) United States Patent
Savin

(10) Patent No.: US 8,093,314 B1
(45) Date of Patent: Jan. 10, 2012

(54) SINGLE COMPONENT COATING COMPOSITION FOR AUTOMOTIVE/MARINE REPAIR

(76) Inventor: Ronald Richard Savin, Rancho Mirage, CA (US)

( * ) Notice: Subject to any disclaimer, the term of this patent is extended or adjusted under 35 U.S.C. 154(b) by 0 days.

(21) Appl. No.: 13/068,541

(22) Filed: May 13, 2011

(51) Int. Cl.
*C08J 9/32* (2006.01)

(52) U.S. Cl. .......................... 523/218; 523/122; 523/219

(58) Field of Classification Search .................. 523/122, 523/218, 219
See application file for complete search history.

(56) References Cited

U.S. PATENT DOCUMENTS 5,252,632 A * 10/1993 Savin ............................. 523/137

* cited by examiner

*Primary Examiner* — Edward Cain

(74) *Attorney, Agent, or Firm* — Jayadeep R. Deshmukh

(57) ABSTRACT

The present invention provides an improved single component coating composition for automotive/marine repair which is useable as a body filler.

6 Claims, No Drawings

SINGLE COMPONENT COATING COMPOSITION FOR AUTOMOTIVE/MARINE REPAIR

FIELD OF THE INVENTION

The present invention is directed to an improved single component coating composition for automotive/marine repair which is useable as a body filler.

BACKGROUND OF THE INVENTION

Automobiles and boats/ships etc are susceptible to corrosion and other damage by way of accidents and/or because of the environment. Body fillers are used to repair accident damage and coatings to prevent corrosion damage. Body fillers in general are known in the art as body putty. Automobiles in particular are susceptible to damage and accidents and when such accidents or damage happen, the metal body or substrate is at its most susceptible to corrosion damage. While substrates' inherent corrosion resistance has improved significantly (by the use of zinc-coated or galvanized steel) over the years especially with zinc infused steel being used, accidents and damage render such protection vulnerable to progressive corrosion damage. The present invention represents a significant step forward in body filler science by providing a single component coating composition useable as a body filler, which addresses the drawbacks in presently available body fillers by not requiring the mixing of two separate components and eliminating the need for use of harmful organics especially in the amounts used in presently available body fillers.

It has been well known to repair the dented or gouged steel surfaces of automobile body parts by applying a putty composed of a thermoset resin to the damaged metal surfaces. The putty is allowed to harden and is subsequently shaped to conform to the desired contour of the automobile body part. See U.S. Pat. No. 5,169,723. U.S. Pat. No. 4,525,427 discloses film forming body putty primers which are used as a substrate over which the body putty is applied. U.S. Pat. Nos. 4,732,633 and 4,148,122 disclose patches or moldable plastic materials to fill the cavity or depression formed from the accident and then optionally applying a filler or putty over the patch or moldable plastic material. U.S. Pat. No. 4,451,605 discloses a one part composition useful as a putty for filling recessed areas of damaged auto bodies and the like which comprises by volume 6 to 25 parts of a binder comprising substantially non-reactive solvent-soluble polyureathane, 43-68 parts solvent and 20-42 parts talc filler. The invention is said to be particularly related to use on soft facia or flexible body parts. U.S. Pat. No. 5,852,067 discloses a putty composition cradle by near infrared rays comprising a resin containing at least one ethylenically unsaturated group, a polymerizable unsaturated compound, a polymerization initiator of the near infrared types and a resin powder gelation polymer. U.S. Pat. No. 7,781,514 discloses a hardener composition comprising a carrier such as a reactive polymer, a peroxide catalyst, a thickening and volumetrically increasing agent which can be hollow glass microspheres, wherein the hardener composition forms part of a two component system. The application for this two-component system is in auto body repair and the like.

U.S. Pat. No. 5,338,348 discloses a coating composition for use in protecting metallic substrates from corrosion, comprising in weight percent, based on the total weight of the composition: from about 7% to 35% of film-forming substance for example a silicate, epoxy resin, vinyl chloride resin, polyurethane resin, acrylic or methacrylic ester polymer or an emulsion polymer; from about 35% to 55% of zinc powder; from about 5% to 25% of zinc flakes; from about 1% to 5% of at least one kind of amorphous silica; and up to about 30% particulate ferrophosphate whilst U.S. Pat. No. 5,334,631 describes a resin-based coating composition containing a mixture of zinc powder and zinc flake, epoxy resins being the preferred resins but polyesters, polyacrylates and polyurethanes being mentioned as possible alternatives.

U.S. Pat. No. 7,201,790 provides a coating composition comprising zinc particles and a binder wherein the zinc particles contain at least 80% by weight of zinc flake and wherein the zinc particle to binder weight ratio is between 2:1 to 9:1, preferably between 3:1 to 8:1 and advantageously between 4:1 to 6:1 e.g. 5:1. The coating composition may be an anti-fouling composition or an anti-corrosive composition. The coating composition may also inhibit or galvanize rust formation.

U.S. Pat. No. 5,792,803 discloses a coating composition for use in protecting metallic substrates from corrosion, comprising in weight percent, based on the total weight of the composition; from about 10% to 20% of a film forming substance; from about 45% to 55% of zinc powder, from about 25% to 35% of zinc dust; from about 1.5% to 2.5% of hollow glass microspheres having diameters ranging from 1 to about 150 microns and a true density of 0.3 to 1.1; from about 2% to 15% by weight of the film forming substance, of a hardener, about 1% to 2% by weight of the film forming substance, of an amorphous silica; and about 0.3% to 1% of a flow control agent.

U.S. Pat. No. 5,677,367 discloses a precursor powder composition comprising a resin, a combination of zinc dust, zinc powder and zinc-coated microspheres and graphite, said powder being soluble in a solvent blend at a facility remote from the powder manufacturing facility, thereby, decoupling the powder manufacturing process from the end use of the powder which could be in a traditional solvent-based paint. Also disclosed are coating compositions for use in protecting metallic substrates from corrosion, comprising necessary additives and film forming substances including alkyl silicate, epoxy resins, powder and non-powder, and polyester resins, all the compositions being modified with about 4 to about 20 weight percent graphite powder based on total weight of the composition.

U.S. Pat. No. 5,580,907 discloses a coating composition for use in protecting metallic substrates from corrosion, comprising in weight percent, based on the total weight of the composition: from about 10% to 20% of a film forming substance; from about 45% to 55% of zinc powder; from about 25% to 35% of zinc dust; from about 1.5% to 2.5% of hollow glass microspheres having diameters ranging from 1 to about 150 microns and a true density of 0.3 to 1.1; from about 2% to 15% by weight of the film forming substance, of a hardener; about 1% to 2% by weight of the film forming substance, of an amorphous silica; and about 0.3% to 1% of a flow control agent.

U.S. Pat. No. 5,413,628 discloses a stable coating composition for use in protecting metallic substrates from corrosion, comprising in weight percent, based on the total weight of the composition: from about 7% to 35% of alkyl silicate as a film forming substance; from about 35% to 55% of zinc powder; from about 5% to 25% of zinc flakes; from about 0.2 to 5% of at least one amorphous silica; and up to about 30% particulate ferrophosphate; wherein the alkyl silicate comprises, in weight percent, based on the weight of the alkyl silicate: from about 5% to 20% of tetraethyl orthosilicate.

U.S. Pat. No. 5,252,632 discloses coating compositions comprising lightweight, non coated hollow, glass microspheres having high isostatic crush resistance, low specific gravity and low oil absorption, for use as cathodic coatings for prevention of corrosion in metallic substrates; and for use as conductive coatings for attenuation of EMI/RFI interference in electronic components, the conductive coatings being suitable for application on metallic and non-metallic substrates. The coating compositions include from about 20% to 60% of film-forming polymer; from about 10% to 50% of a conductive phase, said conductive phase having a minimum relative conductivity with respect to copper of 0.2, said conductive phase being present in said coating composition in a form designed to increase the solids volume of said coating composition without reducing the conductivity of said coating composition, and said conductive phase having a more negative electrode potential than said substrate; and from about 2% to 40% of non-coated hollow glass microspheres having diameters ranging from 1 to about 150 microns and a specific gravity of 0.3 to 1.2. The composition further comprises thickening agents selected from the group consisting of sodium salts of carboxyl-containing acrylic polymers, hydroxyethyl cellulose, colloidal clay and gum arabic, present in an amount ranging from 2 to 6 volume percent based on the total volume of the composition. The composition still further comprises: wetting agents which have a lipophilic part and a hydrophilic part, said lipophilic part being selected from the group consisting of the hydrocarbon chain of fatty acid, a petroleum hydrocarbon chain or an aromatic hydrocarbon with alkyl side chains and said hydrophilic part being selected from the group consisting of a carboxylate, sulfate, sulfonate, alcohol or ether-alcohol, present in an amount ranging from 0.3 to 1 volume percent based on the total volume of the composition. The composition optionally further comprises a volatile component, selected from the group consisting of aliphatic hydrocarbons, aromatic hydrocarbons, esters, ketones, ether alcohols, ether esters and mixtures thereof or water.

Within the European Union, more than 100,000 car body repair workers are directly exposed to the organic compound, styrene. A recent study indicated that approximately 1,300 people a year who are exposed to styrene go on to develop health problems. The compound has been potentially linked to asthma, dermatitis and other indirect health issues. Styrene, which is derived from petroleum and natural gas by-products, is widely used in the production of car repair materials such as bodyfiller. In response to Styrene Reduction Directives, the European Union Framework 6 Programme commissioned a project with a grant of €1.3 million, aimed at removing the use of styrene in vehicle body fillers in order to improve conditions for workers in the car body repair industry. The project, involving participants from Denmark, Germany, Poland, Portugal, Spain, Sweden, and the United Kingdom, was named "SafeWorker". For three years, the "Safeworker" consortium has been involved in researching and patenting a variety of bodyfiller materials which are hardened by exposure to ultra violet light; the most successful are now undergoing extensive laboratory and field trials prior to their launch. The "Safeworker" products are not only intended to be more environmentally friendly and safer to use than conventional bodyfillers, they are also expected to reduce material wastage and shorten the time taken to repair a car. It is anticipated they will eventually replace the market for traditional bodyfillers. The cure of the Safeworker filler utilises UV light which causes the filler to cure very rapidly and without the need for complex health and safety systems. The Safeworker filler is an environmentally friendly, styrene, VOC, solvent-free, one pack system. The Safeworker filler can produce faster turn-around of repairs at reduced costs (minimal wastage from mixing).

The Safeworker program has assigned all Intellectual Property to an entity known as Uvasol. Uvasol published U.S. Patent Application No. 20080193744 discloses a body of UV settable polymer material is quickly cured to a solid state by applying UV radiation from a lamp. The polymer is mixed with strands of optical fibres. The radiation is able to penetrate up to 3 mms through the polymer allowing it to enter the optical strands and to pass between adjoining strands so as to penetrate uniformly the whole of the polymer body. The optical strands can be designed so that they leak radiation from their sides thereby assisting in the transfer of radiation from a strand into the polymer and into other strands. In an alternative arrangement the strands can be longer and possibly woven or otherwise formed into a mat of fibres sufficiently close to allow radiation to pass between them. Because the radiation passes from one fibre to another, it can be introduced through only one or a selection of the fibres.

SUMMARY OF THE INVENTION

It is a primary object of the present invention to significantly increase the volume of hollow non-coated glass microspheres within a coating composition useable as a body putty formulation, thereby allowing deeper deposition and affording a ceramic air glass barrier.

A second object of the present invention is to provide an effective coating composition useable as an auto-marine body filler to repair and fill damaged areas for auto marine repair.

A third object of the present invention is to provide a coating composition useable as an auto-marine body filler which is a single component system and which cures faster than presently available body fillers.

A fourth object of the present invention is provide a coating composition useable as an auto-marine body filler composition which has an indefinite pot life and thus can be stored, opened, closed without gelling.

A fifth object of the present invention is to provide a coating composition useable as an auto-marine body filler which permits several coats to be applied over a repaired surface without sagging or the like.

A sixth object of the present invention is to provide a coating composition useable as an auto-marine body filler which can be deposited at thicknesses in excess of 10 mils (each coat).

To achieve the foregoing and other objects, and in accordance with one aspect of the present invention as described herein, there is provided a coating composition for use in automotive/marine repair, comprising in volume percent, based on the volatile-component-free volume of the composition: from about 45 to 60% of hollow glass microspheres having a specific gravity ranging from 0.3 to 1.2; between about 20 and 35% of a methyl methacrylate resin; 10-30% of a conductive phase selected from zinc dust and zinc flakes; optionally about 10-15% of a filler material selected from barium sulfate, calcium carbonate or talc; and from about 0.2 to 3% of fumed silica.

DETAILED DESCRIPTION OF THE INVENTION

The hollow glass microspheres have a specific gravity ranging from 0.3 to 1.2. Suitable commercially available microspheres include: Potters sodium borosilicate microspheres sold under the trade name Potters 60's (60,000 lbs/inch crush strength); Potters 34's (3000 lbs/inch crush strength).

The methyl methacrylate (an acrylic copolymer) resin is another critical component of the composition of the present invention. Suitable methyl methacrylate resins are sold by Dianal America, Inc under the trade name TB-143. BR-121DA is also useable for the purpose of the present invention—however it is not REACH (Regulation (EC) No. 1907/2006) compliant.

The conductive phase is selected from zinc dust and zinc flake. Zinc dust is manufactured by Purity Zinc. Suitable zinc dust is sold under trade name UP-4 (4 microns) by Purity Zinc. Zinc flake is manufactured by Umicore. Suitable zinc flake is sold under trade name 4P64, or 4P18 or 4P32.

Fumed silica is sold by Cabot or DeGussa. Cab-O-Sil EH-5 is suitable for the present invention.

The filler is manufactured by Bartex under trade name Barytes.

The following specific examples are given to illustrate preferred embodiments of compositions of the invention but are not to be construed as limitations on the invention herein claimed.

Example 1

| Volume % | Material | Trade name |
| --- | --- | --- |
| 27.5 | methyl methacrylate resin | Dianal TB-143 |
| 45 | hollow glass microspheres | Potters 60's |
| 10.5 | barium sulfate | Barytes |
| 14.5 | zinc dust | Umicore 4P32 |
| 2.5 | silica | Cabot Cabosil |

Example 2

| Volume % | Material | Trade name |
| --- | --- | --- |
| 22.5 | methyl methacrylate resin | Dianal TB-143 |
| 52.3 | hollow glass microspheres | Potters 34's |
| 11 | zinc flake | Hyperseal |
| 14 | zinc dust | Umicore 4P32 |
| 0.2 | silica | Cabot Cabosil EH-5 |

Example 3

| Volume % | Material | Trade name |
| --- | --- | --- |
| 22 | methyl methacrylate resin | Dianal TB-143 |
| 52 | hollow glass microspheres | Potters 34's |
| 11 | barium silicate | Barytes |
| 14 | zinc dust | Umicore 4P32 |
| 2 | silica | Cabot Cabosil EH-5 |

The invention claimed is:

1. A coating composition for use in automotive/marine repair, comprising in volume percent, based on the volatile-component-free volume of the composition: from about 45 to 60% of hollow glass microspheres having a specific gravity ranging from 0.3 to 1.2; between about 20 and 35% of a methyl methacrylate resin; 10-30% of a conductive phase selected from zinc dust and zinc flakes; optionally about 10-15% of a filler material selected from barium sulfate, calcium carbonate, talc; and from about 0.2 to 3% of fumed silica.

2. The coating composition of claim 1, wherein it can be effectively applied at a thickness in excess of 15 mils without sagging.

3. The coating composition of claim 2, wherein it cures within 25 minutes at ambient temperature.

4. The coating composition of claim 1, wherein it cures at temperatures below 40 degrees Fahrenheit.

5. A process for transforming the coating composition of claim 1 into a form wherein it can be applied onto a substrate comprising:

mixing the coating composition with a solvent blend which makes the composition sprayable, brushable or aerosolable.

6. The coating composition of claim 1, including from about 50-55% hollow glass microspheres and from about 20-30% of the methyl methacrylate resin.

\* \* \* \* \*